US011548318B2

(12) United States Patent
Civiero (10) Patent No.: US 11,548,318 B2
(45) Date of Patent: Jan. 10, 2023

(54) ADAPTER FOR A SPROCKET-CARRYING BODY FOR A BICYCLE REAR WHEEL

(71) Applicant: CAMPAGNOLO S.r.l., Vicenza (IT)

(72) Inventor: Mirco Civiero, Montecchia di Crosara (IT)

(73) Assignee: CAMPAGNOLO S.r.l., Vicenza (IT)

( * ) Notice: Subject to any disclaimer, the term of this patent is extended or adjusted under 35 U.S.C. 154(b) by 296 days.

(21) Appl. No.: 16/937,265

(22) Filed: Jul. 23, 2020

(65) Prior Publication Data

US 2021/0031560 A1 Feb. 4, 2021

(30) Foreign Application Priority Data

Jul. 30, 2019 (IT) .................. 102019000013287

(51) Int. Cl.
| | |
|---|---|
| *B60B 27/04* | (2006.01) |
| *B60B 27/02* | (2006.01) |
| *B62M 9/10* | (2006.01) |
| *F16H 55/30* | (2006.01) |

(52) U.S. Cl.
CPC ............ *B60B 27/04* (2013.01); *B60B 27/023* (2013.01); *B62M 9/10* (2013.01); *F16H 55/30* (2013.01)

(58) Field of Classification Search
CPC ..... B62M 9/10; B62M 9/12; F16D 2001/103; F16D 41/30
USPC ......................................................... 474/160
See application file for complete search history.

(56) References Cited

U.S. PATENT DOCUMENTS

| | | | | |
|---|---|---|---|---|
| 3,900,088 | A * | 8/1975 | Ozaki ................... | F16D 41/30 192/64 |
| 4,472,163 | A * | 9/1984 | Bottini .................. | B62M 9/10 192/64 |
| 5,704,859 | A * | 1/1998 | Feng ..................... | F16D 41/30 474/903 |
| 6,264,575 | B1 * | 7/2001 | Lim ...................... | F16D 41/30 192/64 |
| 6,428,437 | B1 * | 8/2002 | Schlanger ............. | B62M 9/12 474/160 |
| 7,959,529 | B2 * | 6/2011 | Braedt ................... | B62M 9/10 474/158 |
| 8,197,371 | B2 * | 6/2012 | D'Aluisio .............. | B62M 9/12 301/110.5 |

(Continued)

FOREIGN PATENT DOCUMENTS

| | | |
|---|---|---|
| DE | 94 08 910 U1 | 7/1994 |
| EP | 1 342 657 A2 | 9/2003 |

(Continued)

OTHER PUBLICATIONS

European Search Report for European Application No. 20187782.6, dated Nov. 30, 2020.

*Primary Examiner* — Henry Y Liu
(74) *Attorney, Agent, or Firm* — Volpe Koenig (57) ABSTRACT

A bicycle rear wheel adapter has an annular body that abuts a sprocket-carrying body that extends in an axially outer direction and receives sprockets in radially peripheral positions. A coupling element on the annular body couples with the sprocket-carrying body so the adapter rotates as a unit with the sprocket-carrying body, and a sprocket-receiving seat on the annular body couples with a sprocket so the adapter rotates as a unit with the sprocket. The adapter is suitable for cogsets with small sprockets grouped in a monolithic grouping.

14 Claims, 8 Drawing Sheets

(56) References Cited

U.S. PATENT DOCUMENTS

| | | | |
|---|---|---|---|
| 8,663,044 B2 | 3/2014 | Lin | |
| 8,820,852 B2* | 9/2014 | Van Hoek | F16H 7/20 301/110.5 |
| 8,956,254 B2* | 2/2015 | Tokuyama | B62M 9/12 474/160 |
| 9,150,280 B2 | 10/2015 | Braedt | |
| 9,182,016 B2 | 11/2015 | Spahr et al. | |
| 9,533,735 B2 | 1/2017 | Braedt | |
| 10,773,772 B2 | 9/2020 | Fukumori et al. | |
| 10,774,915 B2 | 9/2020 | Iwai et al. | |
| 10,946,933 B2 | 3/2021 | Braedt | |
| 11,192,606 B2 | 12/2021 | Braedt | |
| 11,199,252 B2 | 12/2021 | Civiero | |
| 2003/0064844 A1 | 4/2003 | Lin | |
| 2004/0142783 A1* | 7/2004 | Kamada | B60B 27/04 474/160 |
| 2005/0009654 A1* | 1/2005 | Kanehisa | B60B 27/04 474/160 |
| 2006/0014599 A1* | 1/2006 | Meggiolan | B62M 9/10 474/160 |
| 2006/0063624 A1 | 3/2006 | Voss | |
| 2008/0004143 A1* | 1/2008 | Kanehisa | B62M 9/10 474/160 |
| 2008/0188336 A1* | 8/2008 | Tokuyama | B62M 9/10 474/160 |
| 2008/0230344 A1 | 9/2008 | Braedt | |
| 2008/0231014 A1 | 9/2008 | Braedt | |
| 2008/0234082 A1* | 9/2008 | Braedt | B62M 9/10 474/116 |
| 2009/0042679 A1 | 2/2009 | Valle | |
| 2009/0042681 A1 | 2/2009 | Dal Pra et al. | |
| 2009/0098966 A1* | 4/2009 | Kamada | B62M 9/10 474/160 |
| 2009/0191996 A1 | 7/2009 | D'Aluisio | |
| 2010/0009794 A1 | 1/2010 | Chiang | |
| 2010/0075791 A1* | 3/2010 | Braedt | B62M 9/10 474/160 |
| 2010/0099530 A1* | 4/2010 | Chiang | B62M 9/10 474/160 |
| 2011/0092327 A1* | 4/2011 | Oishi | B62M 9/10 474/160 |
| 2011/0168513 A1 | 7/2011 | Filipe | |
| 2012/0196711 A1* | 8/2012 | Loy | B62M 9/10 474/160 |
| 2012/0208662 A1 | 8/2012 | Braedt | |
| 2012/0225745 A1* | 9/2012 | Oishi | B62M 9/121 474/160 |
| 2012/0244976 A1* | 9/2012 | Lin | B62M 9/10 474/160 |
| 2012/0244977 A1* | 9/2012 | Liao | B62M 9/10 474/160 |
| 2012/0244978 A1* | 9/2012 | Liao | B62M 9/10 474/160 |
| 2012/0302384 A1 | 11/2012 | Braedt | |
| 2012/0322598 A1* | 12/2012 | Lin | B62M 9/10 474/160 |
| 2013/0017914 A1* | 1/2013 | Braedt | B62M 9/10 403/299 |
| 2013/0035183 A1 | 2/2013 | Tokuyama et al. | |
| 2013/0225343 A1 | 8/2013 | Spahr et al. | |
| 2014/0110208 A1* | 4/2014 | Braedt | B60B 27/023 192/46 |
| 2014/0179474 A1* | 6/2014 | Florczyk | F16H 55/30 474/160 |
| 2015/0024884 A1* | 1/2015 | Braedt | F16H 9/24 474/78 |
| 2015/0133249 A1* | 5/2015 | Tsai | B62M 9/12 474/160 |
| 2016/0059932 A1 | 3/2016 | Braedt | |
| 2016/0083045 A1* | 3/2016 | Lin | F16H 55/30 474/160 |
| 2016/0114859 A1* | 4/2016 | Tsai | B62M 9/10 474/160 |
| 2016/0167737 A1* | 6/2016 | Tokuyama | B62M 9/10 474/160 |
| 2016/0176477 A1* | 6/2016 | Bernardele | B62M 9/12 474/160 |
| 2016/0258523 A1* | 9/2016 | Reineke | F16H 55/30 |
| 2016/0362159 A1* | 12/2016 | Braedt | F16H 55/30 |
| 2017/0043840 A1 | 2/2017 | Reinbold et al. | |
| 2017/0057598 A1 | 3/2017 | Thrash et al. | |
| 2017/0217539 A1 | 8/2017 | Braedt | |
| 2018/0022415 A1* | 1/2018 | Oishi | F16H 55/30 474/160 |
| 2018/0022416 A1* | 1/2018 | Oishi | B62M 9/12 474/160 |
| 2018/0215444 A1* | 8/2018 | Reinbold | B62M 9/10 |
| 2019/0054765 A1 | 2/2019 | Thrash | |
| 2019/0063585 A1* | 2/2019 | Fujita | B62M 9/12 |
| 2019/0178313 A1* | 6/2019 | Wrobel | F16D 41/30 |
| 2019/0225301 A1 | 7/2019 | Emura et al. | |
| 2019/0225302 A1 | 7/2019 | Emura et al. | |
| 2019/0263473 A1 | 8/2019 | Braedt | |
| 2019/0359284 A1 | 11/2019 | Fukunaga et al. | |
| 2020/0062033 A1 | 2/2020 | Bots | |
| 2020/0269953 A1 | 8/2020 | Fukunaga et al. | |
| 2021/0284281 A1 | 9/2021 | Carrasco Vergara | |

FOREIGN PATENT DOCUMENTS

| | | |
|---|---|---|
| EP | 1 495 879 A2 | 1/2005 |
| EP | 3 109 062 A1 | 12/2016 |

\* cited by examiner

ADAPTER FOR A SPROCKET-CARRYING BODY FOR A BICYCLE REAR WHEEL

CROSS REFERENCE TO RELATED APPLICATION

This application claims the benefit of Italian Application No. 102019000013287, filed on Jul. 30, 2019, which is incorporated herein by reference as if fully set forth.

FIELD OF INVENTION

The present invention relates to an adapter for a sprocket-carrying body of a freewheel group for a bicycle rear wheel.

BACKGROUND

Hereinafter, the spatial indications, like in particular those of radial, axial and circumferential direction, will be given with reference to the rotation axis of the rear wheel of the bicycle, which coincides with the axis of the cogset, of the sprocket-carrying body, of the hub of the wheel and in general of all of the elements that rotate with the wheel. Moreover, the axial direction will be indicated as outwards if directed away from the longitudinal mid-plane of the bicycle or away from the hub of the wheel, and vice-versa as inwards if directed towards such a mid-plane or towards the hub. The short indications outer and inner (or axially outer and axially inner) will also be used in the same way: outer thus equates to facing in the outward axial direction and inner equates to facing in the inward axial direction.

In order to mount a cogset on the hub of a bicycle rear wheel, a so-called sprocket-carrying body is normally used, which on one side is made to rotate as a unit with the sprockets through shape coupling, and on the other side is made to rotate as a unit—however in a unidirectional manner—with the hub through a set of ratchets or similar, commonly called freewheel. In this way, the transmission chain engaged with the various sprockets is capable of transmitting a torque to the hub in the advancing direction of the bicycle.

The sprocket-carrying body essentially consists of a tubular body that is mechanically coupled at the radially peripheral surface thereof with central mounting openings made in the sprockets. The radially peripheral surface of the sprocket-carrying body is shaped with substantially axial ribs and grooves, alternating in the circumferential direction, adapted for allowing the aforementioned shape coupling. For this purpose, the central mounting openings of the sprockets are provided with extensions or projections directed radially towards the rotation axis which couple with the grooves present on the sprocket-carrying body.

The sprockets are thus mounted axially on the sprocket-carrying body in succession, from the sprocket having the largest diameter, so that when the sprocket-carrying body is mounted on the hub of the wheel of the bicycle the sprockets of larger diameter are located towards the inside, i.e. close to the rear wheel, whereas the sprockets of smaller diameter are located towards the outside.

The ribs and grooves on the radially peripheral surface of the sprocket-carrying body also perform the function of providing a so-called mounting key, for the correct angular positioning of each sprocket. The expression mounting key is meant to indicate a particular axial profile of an axial portion of the radially peripheral surface of the sprocket-carrying body and a corresponding profile of the central mounting opening of each sprocket, wherein these profiles have a well-determined non-regularity in the circumferential direction that allows each sprocket to be mounted on the sprocket-carrying body only in a very precise angular position. The mounting key thus ensures that a predetermined mutual angular phasing is maintained between sprockets which is necessary for the correct operation of the rear gearshift of the bicycle. For example, a mounting key is obtained by providing for the grooves on the sprocket-carrying body to all be the same except for an odd one, and consequently shaping an odd one of the extensions of every sprocket: the coupling of the sprocket on the sprocket-carrying body can thus only take place with that angular position of the sprocket on the sprocket-carrying body that allows the engagement of the odd extension with the odd groove. Of course, for some sprockets it is possible that two or more possible angular positions are provided (due to the repetitiveness in the circumferential direction of the shape features of the toothing), and consequently it is possible to provide two or more odd extensions.

In more modern bicycle gearshifts, particularly for bicycles intended for racing, there is a well-known tendency to increase the number of sprockets. When a cogset reaches 11, 12 or even more sprockets, it may be possible to do without the front gearshift; this simplifies and lightens the bicycle, which is undoubtedly advantageous to the cyclist, provided that this is not accompanied by a penalization in the availability of gear ratios.

In order to allow this result, it is necessary to have a small sprocket with a very low number of teeth, for example 10 or 9, in the cogset. The small number of teeth, however, is clearly accompanied by a small sprocket diameter, which can become too small to allow mounting on normal sprocket-carrying bodies. It has thus become common to use cogsets in which the smallest sprockets (typically the first three) are made as a unit with each other to form a monolithic group (also commonly called triplet, precisely because it groups together three sprockets), and the central opening for mounting on the sprocket-carrying body extends axially only at the largest sprocket of the group; the smallest sprockets extend more towards the rotation axis, but do not engage with the sprocket-carrying body, since it is ensured that they are set in motion by the fact that they form a unit with the largest sprocket of the group.

In order to allow this type of coupling, it is however necessary for the sprocket-carrying body to have a shorter axial extension with respect to the cogset. In other words, in order to mount a cogset of this type, with the first sprockets very small and fixedly connected to one another to form a monolithic group, on the hub of the bicycle wheel, a special sprocket-carrying body, in particular a short sprocket-carrying body is necessary.

However, such a short sprocket-carrying body cannot allow the mounting of a conventional cogset, in which each sprocket must be individually coupled with the sprocket-carrying body: indeed, the smallest sprockets would be located in an axial position that the sprocket-carrying body does not reach.

Consequently, the demanding cyclist or the professional athlete competing in cycling races, if he/she wishes to use different cogsets depending on the conditions (typically the altimetric profile) of the route that must be traveled, must resign himself/herself to replacing the sprocket-carrying body along with the cogset: indeed, in order to be able to use a cogset with very small sprockets (in particular fixedly connected in a monolithic group) he/she will have to mount a special short sprocket-carrying body on the hub, whereas in order to be able to use a more conventional cogset with not so small sprockets he/she must mount a long sprocket-carrying body.

The problem at the basis of the present invention is that of allowing a flexibility of choice of the cogset without also forcing the replacement of the sprocket-carrying body.

SUMMARY

The problem is solved by an adapter with a coupling element formed on an annular body to establish a coupling with the sprocket-carrying body so the adapter rotates as a unit with the sprocket-carrying body and a sprocket-receiving seat formed on the annular body couples with at least one sprocket so the adapter rotate as a unit with the sprocket

BRIEF DESCRIPTION OF THE DRAWINGS

The features and advantages of the invention will become clearer from the following description of preferred embodiments thereof, made with reference to the attached drawings. In such drawings.

DETAILED DESCRIPTION OF THE PREFERRED EMBODIMENTS

The invention concerns an adapter for a sprocket-carrying body for a bicycle rear wheel, comprising an annular body adapted to abut at the sprocket-carrying body as an extension thereof in an axially outer direction and to receive sprockets in a radially peripheral position, a coupling element formed on the annular body to establish a shape coupling with the sprocket-carrying body that makes the adapter rotate as a unit with the sprocket-carrying body, at least one sprocket-receiving seat formed on the annular body of the adapter and adapted for coupling with at least one sprocket, so as to make the adapter rotate as a unit with the sprocket.

This adapter can be coupled with a sprocket-carrying body, in particular with a short sprocket-carrying body, of the type suitable for cogsets in which the smallest sprockets are grouped in a monolithic group; once coupled with the sprocket-carrying body, it extends the axial extension thereof, thus making it possible to receive cogsets in which the sprockets are separated and can be mounted singularly on the sprocket-carrying set formed by the assembly of the sprocket-carrying body and the adapter.

Therefore, to pass from the use of a cogset of one type to the use of a cogset of the other type it is sufficient to apply or remove the adapter, always leaving the short sprocket-carrying body in position.

Preferably, the coupling element comprises at least one front tooth projecting axially from the annular body, sized so as to be able to insert in a respective groove of the sprocket-carrying body. In this way, the coupling is particularly simple and does not require any adaptation or intervention, not even minimal, on the sprocket-carrying body: indeed, the same grooves already provided on the sprocket-carrying body for the coupling of the sprockets are exploited.

Preferably, the coupling element comprises a plurality of front teeth projecting axially from the annular body, in particular four, sized so as to be able to insert in respective secondary grooves of the sprocket-carrying body. This number of front teeth not only allows an excellent balancing of the torque transmitted between adapter and sprocket-carrying body, but best exploits the unused secondary grooves of the sprocket-carrying body, which are normally indeed four.

In order to have the best balancing, preferably, the front teeth are equally spaced in the circumferential direction.

Preferably, the coupling element comprises a mounting key, for ensuring a predetermined angular phasing of the adapter with respect to the sprocket-carrying body. This facilitates the correct mounting of the adapter on the sprocket-carrying body, avoiding possible angular positioning errors.

Preferably, the receiving seat comprises at least one axially-extending through groove along the radially peripheral surface of the annular body, intended to align with a respective primary groove in the sprocket-carrying body, and even more preferably the receiving seat comprises some—in a most preferred manner four—axially-extending through grooves along the radially peripheral surface of the annular body, intended to align with respective primary grooves in the sprocket-carrying body.

It should be noted that grooves are normally provided on the sprocket-carrying body in a greater number with respect to the coupling requirements of the sprockets, for which reason there are some that are used (here called primary) and others that are not used (here called secondary); usually, there are eight grooves, four of which are primary. This means that the presence of the adapter does not in any way obstruct the insertion of the sprockets, even those of larger diameter that must be arranged first on the sprocket-carrying body, close to the hub: in insertion, which takes place in the axial direction, they are simply made to pass over the adapter until it is past.

In order to have the best balancing, preferably, the grooves of the adapter are equally spaced in the circumferential direction.

Preferably, the receiving seat comprises a mounting key, for ensuring a predetermined angular phasing of the adapter with respect to the sprockets mounted on it. This facilitates the correct mounting of the cogset on the adapter, avoiding possible angular positioning errors.

Preferably, the annular body comprises a front annular surface adapted for abutting against the sprocket-carrying body and a rear annular surface axially opposite the front annular surface. This ensures that the adapter is fully rested against the sprocket-carrying body and thus ensures excellent stability of the assembly; moreover, the fixing of the adapter to the sprocket-carrying body can take place with the same ring nut that ensures that the cogset is fixed to the sprocket-carrying body.

Preferably, the annular body comprises recesses formed in the rear annular surface, preferably four recesses formed in the rear annular surface at the four front teeth.

The invention also relates, in a second aspect thereof, to a sprocket-carrying set for a bicycle rear wheel, comprising a sprocket-carrying body and an adapter according to the first aspect of the invention.

The invention also relates, in a further aspect thereof, to a sprocket-carrying set for a bicycle rear wheel, comprising a sprocket-carrying body provided with grooves extending axially on the radially peripheral surface and an adapter according to the first aspect of the invention.

With reference now to FIGS. 1 to 5, a hub assembly 1 of a bicycle rear wheel (not shown) is represented, with a hub 10 mounted coaxially on a axle 11, by means of bearings 12; the hub 10 is thus free to rotate on the axle 11, whereas the latter is intended to be mounted fixed on the frame of the bicycle. The hub 10 should be deemed to be representative of any hub and will be described only as far as it is of interest for the purposes of the present invention, thus ignoring the features that are not in relation to the present invention.

The hub 10 is coupled with a sprocket-carrying body 14, through a freewheel mechanism (not highlighted in the drawings) that ensures that the hub 10 is set in rotation by the sprocket-carrying body 14 only in the direction that determines an advancing of the bicycle, not in the opposite direction. The sprocket-carrying body 14 has an approximately tubular shape and is mounted free on the axle 11, by means of bearings 15. The sprocket-carrying body 14 is provided on its radially peripheral surface with grooves arranged in the axial direction, in particular with primary grooves 16, preferably four in number and equally spaced in the circumferential direction; the sprocket-carrying body 14 is also provided with four secondary grooves 17, arranged between the primary grooves 16 and equally spaced in the circumferential direction. One primary groove 16a and one secondary groove 17a are of odd shape with respect to the others, so as to provide a mounting key. Moreover, the sprocket-carrying body 14 is provided close to the axially inner end thereof with an end stop 18, in the form of teeth projecting in the radial direction from the sprocket-carrying body 14; alternatively, a flange extending along the entire circumference of the sprocket-carrying body 14 may be provided as an end stop 18 instead of the teeth.

Figure 1:
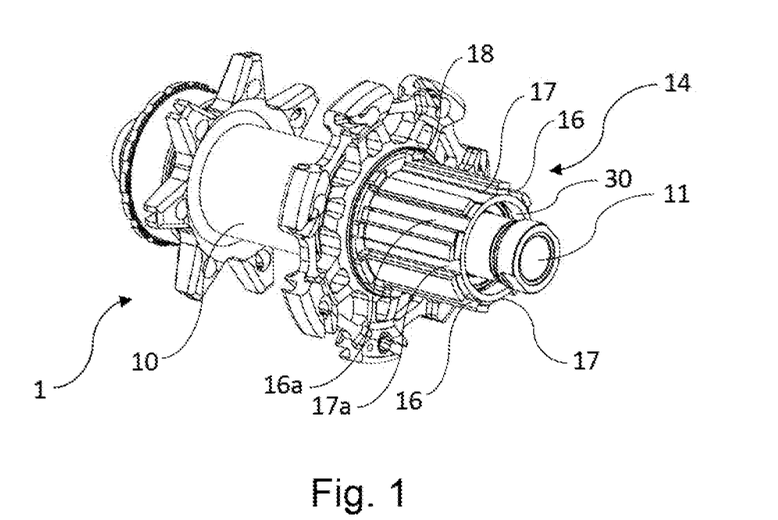
FIG. 1 is a perspective view of a hub of a bicycle rear wheel, with a respective axle and provided with a sprocket-carrying body.
Figure 2:
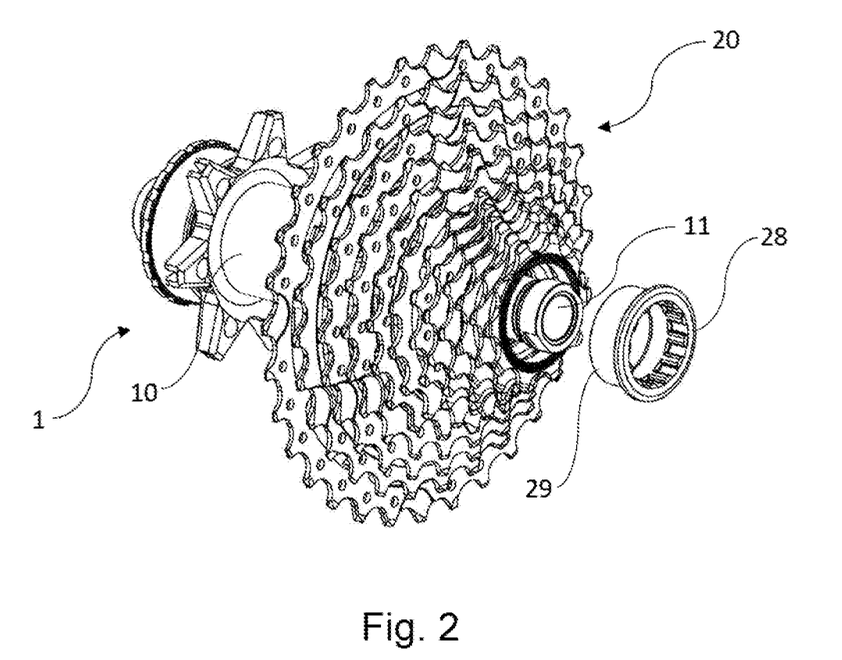
FIG. 2 is a perspective view of the hub of FIG. 1, on which a cogset with the three smallest sprockets formed in a monolithic body (triplet) has also been mounted and a fixing ring nut of the cogset is about to be mounted.
Figure 3:
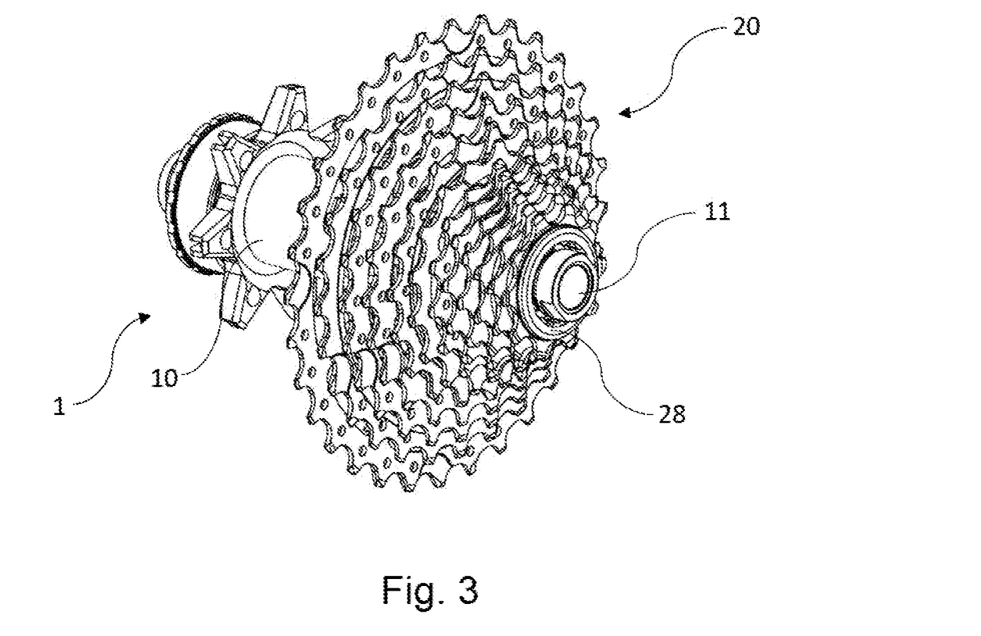
FIG. 3 is a perspective view of the hub of FIG. 2, in which the ring nut has been mounted.
Figure 4:
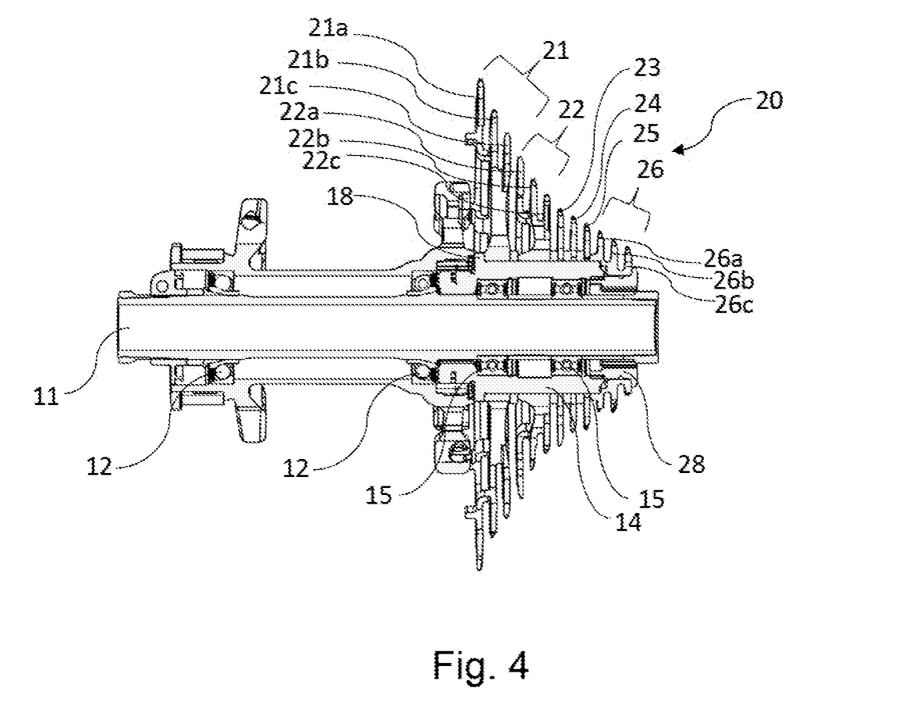
FIG. 4 is a section view of the hub of FIG. 3.
Figure 5:
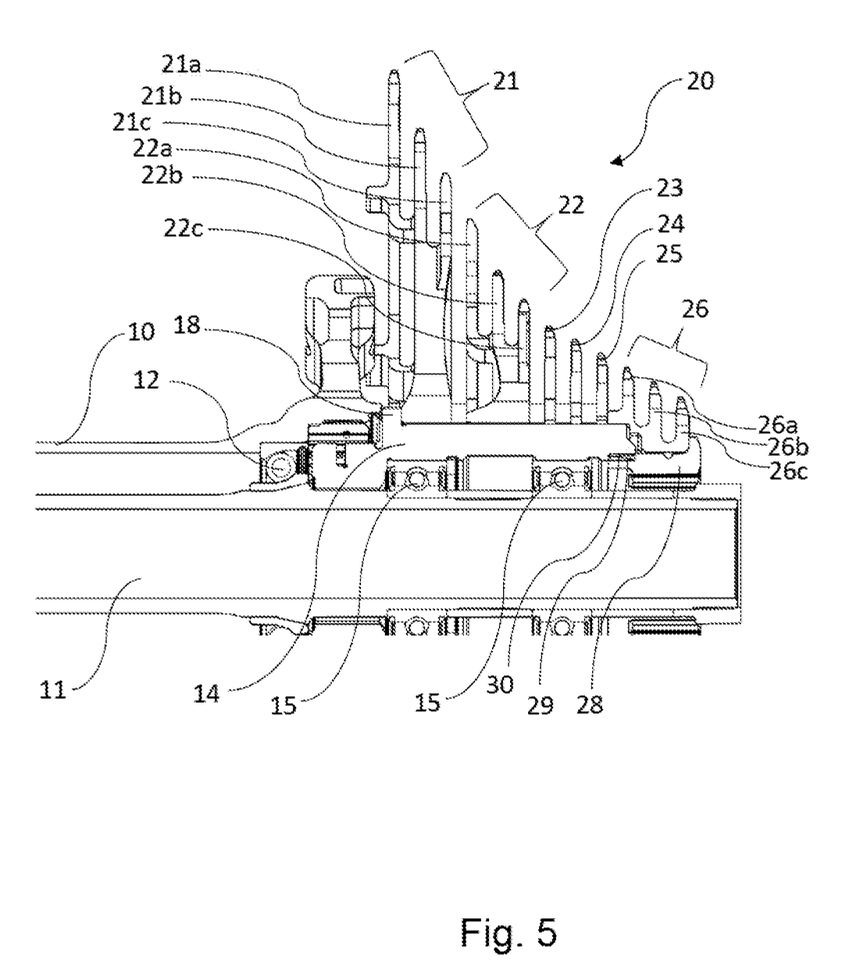
FIG. 5 is an enlarged section view of part of the hub of FIG. 4.
Figure 14:
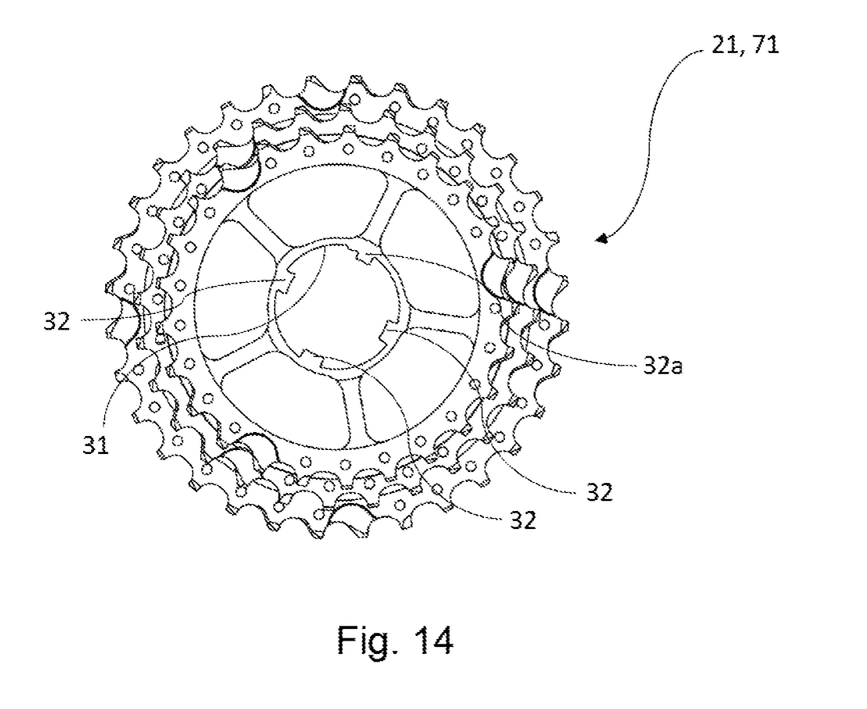
FIG. 14 is a front view of some sprockets of the cogset mounted on the hub of FIG. 2-5 or 10-12.

A cogset 20 is mounted on the sprocket-carrying body 14. The cogset 20 illustrated in FIG. 2-5 comprises 12 sprockets organized from the largest to the smallest as follows: the first three sprockets 21a, 21b, 21c are made as a unit with each other to form a monolithic group (or triplet) 21; the next three sprockets 22a, 22b, 22c are made as a unit with each other to form a monolithic group (or triplet) 22; the next three sprockets 23, 24, 25 are independent from one another; the last three sprockets 26a, 26b, 26c are made as a unit with each other to form a monolithic group (or triplet) 26. These elements are mounted peripherally on the sprocket-carrying body 14, with the triplet 21 rested axially on the end stop 18, the triplet 22 rested axially on the triplet 21, the sprocket 23 rested axially on the triplet 22, the sprocket 24 rested axially on the sprocket 23, the sprocket 25 rested axially on the sprocket 24, the triplet 26 rested axially on the sprocket 25. The triplets 21, 22 and 26 and the sprockets 23-25 have a central opening 31 shaped as shown in FIG. 14, with four radial projections 32, three of which are the same as each other and of a shape matching the section of the primary grooves 16 on the sprocket-carrying body 14, one—indicated with 32a—is odd, of a shape matching the section of the odd primary groove 16a; in the triplet 26, as can be seen in FIGS. 4 and 5, the central opening 31 with the radial projections 32 engages only the innermost axial portion, in practice at only the sprocket 26a, whereas the axially outermost portion has a central opening 33 of smaller diameter than that of the central opening 31, due to the smaller number of teeth present on the sprockets 26b and 26c. It should be noted that there are four radial projections 32 and they engage the four primary grooves 16, leaving the secondary grooves 17 free, which actually only act as weight-reducers, without participating in the coupling between the cogset 20 and the sprocket-carrying body 14.

The triplets 21, 22 and 26 and the sprockets 23-25 are slotted onto the sprocket-carrying body 14, constrained in rotation to the sprocket-carrying body 14 by means of the projections 32 engaged in the grooves 16 but substantially free in the axial direction. Towards the inside in the axial direction (i.e. towards the hub 10), the triplets 21, 22 and 26 and the sprockets 23-25 are held by the end stop 18; towards the outside in the axial direction, the triplets 21, 22 and 26 and the sprockets 23-25 are held by a ring nut 28, inserted on the axle 11 and in the central opening 33 and screwed to the sprocket-carrying body 14, by means of an outer threaded portion 29 of the ring nut 28 and an inner threaded portion 30 of the sprocket-carrying body 14. The tightening of the ring nut 28 ensures that all of the triplets 21, 22 and 26 and the sprockets 23-25 are locked on the sprocket-carrying body 14.

In this hub assembly 1, 12 sprockets, single or grouped in triplets, are mounted. In particular, there is a very small sprocket, the sprocket 26c, which has 10 teeth and that could not be mounted on the sprocket-carrying body 14 without the provision of having grouped it in the triplet 26. Indeed, if this sprocket with 10 teeth were single, it would be too small to be able to have a central opening that is wide enough to be slotted onto the sprocket-carrying body 14; the triplet 26, on the other hand, can have an inner axial portion at the tooth 26a (which has 12 teeth) of dimensions such as to be able to have the central opening 31 suitable for engagement on the sprocket-carrying body 14.

In order to allow the mounting of the triplet 26, the sprocket-carrying body 14 has a shorter axial extension with respect to that which it should have to receive 12 single sprockets having axial dimension equal to that of the sprockets shown. This implies that if it is wished to mount a cogset with single sprockets in the hub assembly 1, the axial extension of the sprocket-carrying body 14 outwards would be insufficient to receive the eleventh and twelfth sprocket. Therefore, irrespective of the number of teeth of the smallest sprockets and thus of the dimensions thereof, a cogset with single sprockets could be mounted only by replacing the sprocket-carrying body 14 with a longer one.

Figure 6:
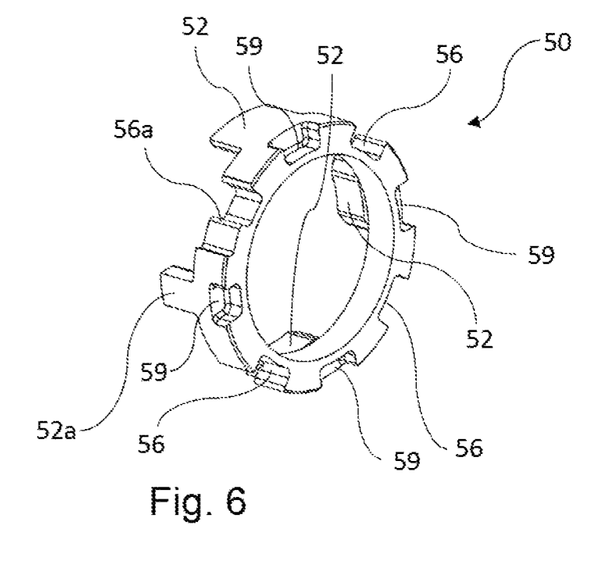
FIG. 6 is a perspective view of an adapter according to the invention.
Figure 7:
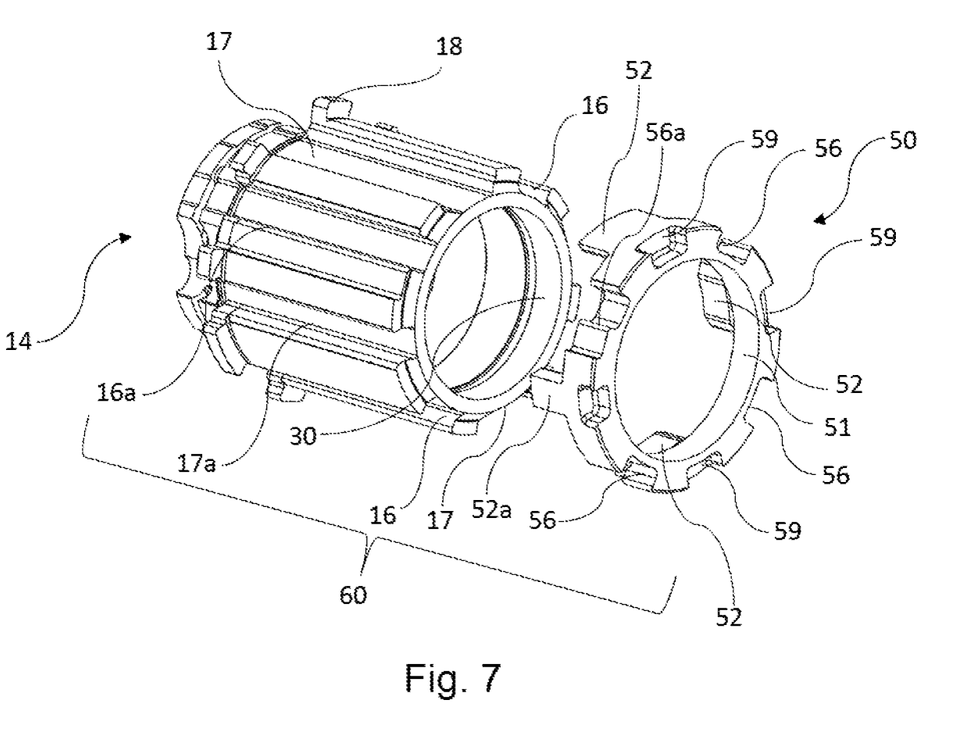
FIG. 7 is a perspective view of the adapter of FIG. 6 and of the sprocket-carrying body of the hub of FIG. 1, aligned and oriented to be coupled.

In FIG. 6 and in the following Figure, an adapter 50 according to the invention is illustrated, intended to be used in association with the sprocket-carrying body 14. The adapter 50 comprises an annular body 51, having outer diameter corresponding to that of the sprocket-carrying body 14 for which it is intended. The adapter 50 is provided with front teeth, preferably four front teeth 52, sized so as to be able to each insert in one of the secondary grooves 17 of the sprocket-carrying body 14. The front teeth 52 are equally spaced in the circumferential direction, like the secondary grooves 17 of the sprocket-carrying body 14 in which they are intended to insert. One of the front teeth, indicated with 52a, is odd, i.e. it has a different shape and/or dimensions from the other front teeth so as to be able to insert in the odd secondary groove 17a when the adapter 50 is coupled with the sprocket-carrying body 14; a mounting key, i.e. in particular one and only one possibility of angular positioning of the adapter 50 with respect to the sprocket-carrying body 14, is thus ensured. The front teeth 52, 52a as a whole determine a coupling element formed on the annular body 51 to establish a shape coupling between the annular body 51 and the sprocket-carrying body 14, thus making the adapter 50 rotate as a unit with the sprocket-carrying body 14.

The adapter 50 is also provided with grooves 56, extending in the axial direction on the radially peripheral surface of the annular body 51; the grooves 56 are preferably four in number and are equally spaced in the circumferential direction, corresponding in number, angular position and shape (section) to the primary grooves 16 of the sprocket-carrying body 14 for which the adapter is intended. The grooves 56 pass through in the axial direction, i.e. they extend on the annular body 51 between a front annular surface 57 of the annular body 51 up to a rear annular surface 58, axially opposite the front annular surface 57. One of the grooves is an odd groove 56a, different from the other grooves, just as in the sprocket-carrying body 14 the odd primary groove 16a is different from the other primary grooves 16.

The annular body 51 also comprises recesses 59, formed in the rear annular surface. Preferably, the recesses 59 are four in number and are formed in angular positions corresponding to the angular positions of the front teeth 52. These recesses 59 are used to provide an alternative possibility of engagement to the smallest sprocket, as will be illustrated hereinafter; one of the recesses 59 is an odd recess 59a, having a different shape (section) from the others, to provide a mounting key.

The grooves 56, 56a and the recesses 59, 59a as a whole determine a sprocket-receiving seat, formed on the annular body 51 of the adapter 50.

Figure 8:
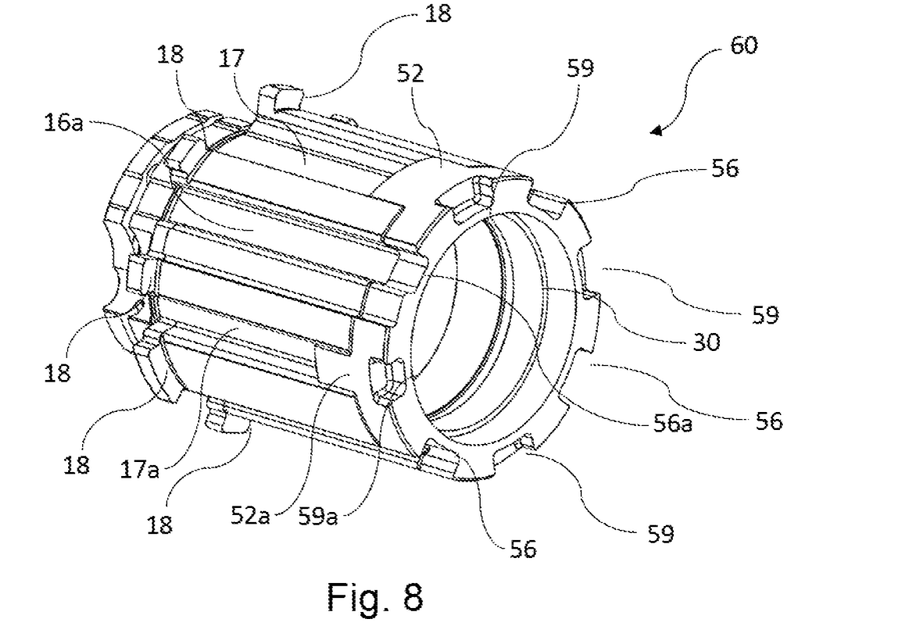
FIG. 8 is a perspective view that shows the adapter of FIG. 6 coupled with the sprocket-carrying body of the hub of FIG. 1.
Figure 9:
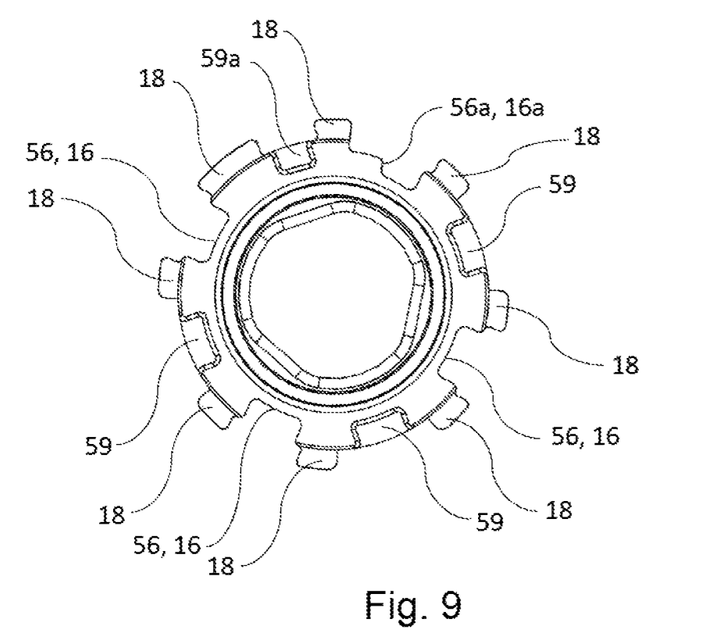
FIG. 9 is a front view of the adapter of FIG. 6 coupled with the sprocket-carrying body of the hub of FIG. 1.

The adapter 50 is intended for use with the sprocket-carrying body 14. In use, the adapter 50 is applied to the sprocket-carrying body 14 as an axial extension thereof, towards the outside. The front annular surface 57 is axially abutted against the sprocket-carrying body 14, whereas the front teeth 52 engage in the secondary grooves 17; the odd front tooth 52a engages in the odd secondary groove 17a. In this way, the grooves 56 of the adapter 50 are exactly aligned in the axial direction with the primary grooves 16 of the sprocket-carrying body 14, with the odd groove 56a aligned with the odd primary groove 16a. The result is in practice an extension of the sprocket-carrying body 14 obtained through the adapter 50, i.e. a sprocket-carrying set 60 formed from the assembly of the sprocket-carrying body 14 and the adapter 50 is obtained.

It is thus possible to mount a cogset 70 in which the smallest sprockets are single, i.e. not grouped in a triplet, on the sprocket-carrying assembly 60.

Figure 10:
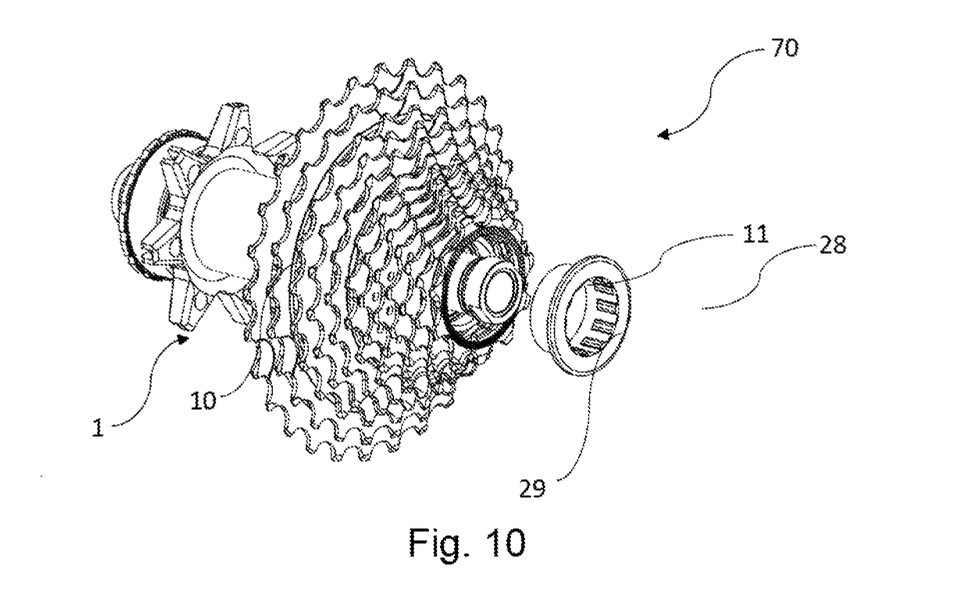
FIG. 10 is a perspective view of the hub of FIG. 1, on which a cogset with the smallest sprockets not grouped in a monolithic body (without triplet) has also been mounted and the fixing ring nut of the cogset is about to be mounted.
Figure 11:
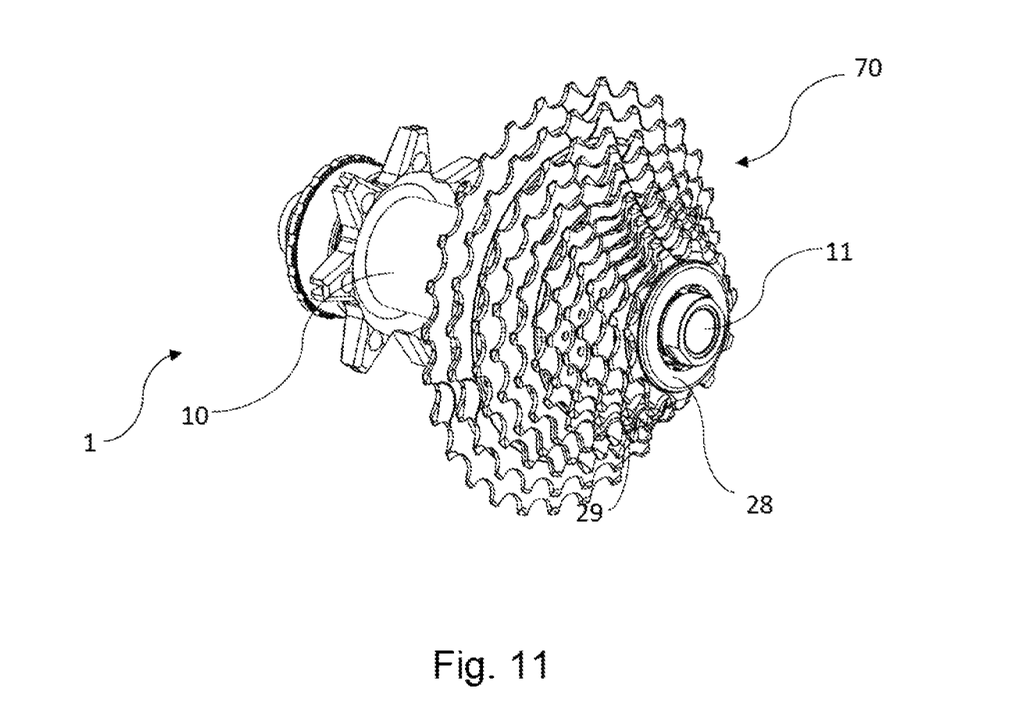
FIG. 11 is a perspective view of the hub of FIG. 10, in which the ring nut has been mounted.
Figure 12:
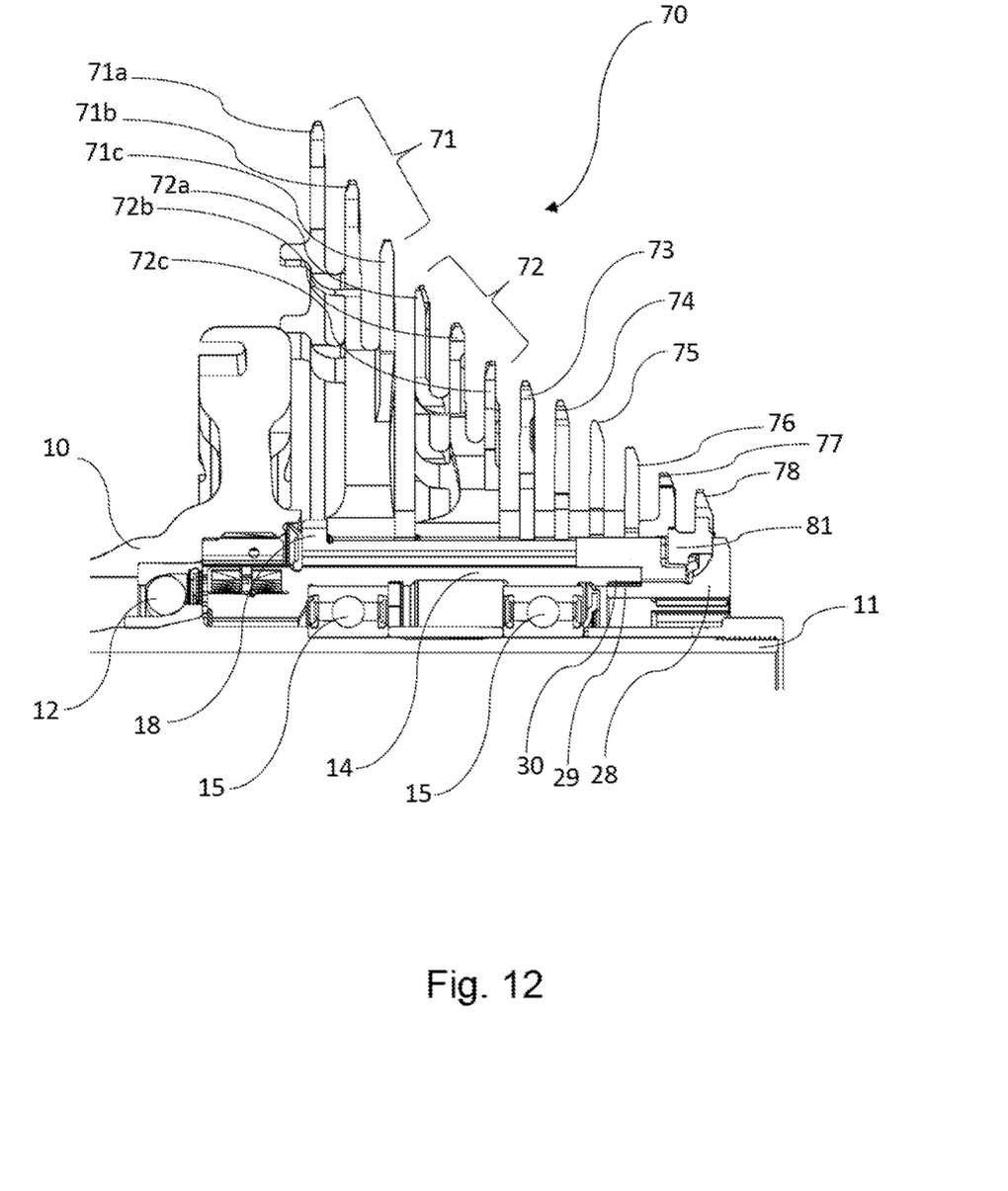
FIG. 12 is a section view of the hub of FIG. 11.
Figure 13:
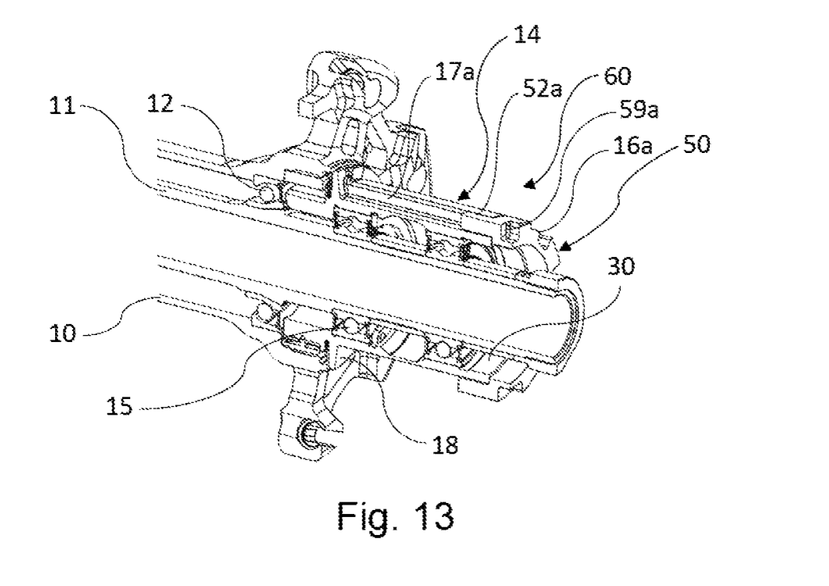
FIG. 13 is a perspective section view of the hub of FIG. 10, represented without the cogset.

As can be seen in FIGS. 10-12, the cogset 70 comprises 12 sprockets, organized from the largest to the smallest as follows: the first three sprockets 71a, 71b, 71c are made as a unit with one another to form a monolithic group (or triplet) 71; the next three sprockets 72a, 72b, 72c are made as a unit with one another to form a monolithic group (or triplet) 72; the next six sprockets 73, 74, 75, 76, 77, 78 are independent from one another. These elements are mounted peripherally on the sprocket-carrying set 60, with the triplet 71 rested axially on the end stop 18, the triplet 72 rested axially on the triplet 71, and the single sprockets 73-78 rested axially the first on the triplet 72, the other on one another in succession. The triplets 71, 72 and the sprockets 73-77 have the same central opening 31 of the cogset 20, shaped as shown in FIG. 14, with the four radial projections 32, three of which are the same as one another and have a shape matching the section of the primary grooves 16 on the sprocket-carrying body 14, and one—indicated with 32a—odd one, having a shape matching the section of the odd primary groove 16a. Only the smallest sprocket 78, as normal in cogsets with a large number of sprockets (for example twelve), is coupled with the sprocket-carrying set 60 not through a central opening and radial projections, but rather through teeth 81, projecting axially from the sprocket 78 so as to engage in the recesses 59 of the adapter 50; in order to ensure a mounting key, one of the teeth is an odd tooth 81a and it engages in the odd recess 59a.

Towards the inside in the axial direction (i.e. towards the hub 10), the cogset 70 is held by the end stop 18; towards the outside in the axial direction, the cogset 70 is held together with the adapter 50 by the ring nut 28, inserted on the axle 11 inside the annular body 51 and screwed to the sprocket-carrying body 14, by means of the outer threaded portion 29 of the ring nut 28 that engages with the inner threaded portion 30 of the sprocket-carrying body 14. The tightening of the ring nut 28 ensures that all of the triplets 71, 72 and the sprockets 73-78 are locked on the sprocket-carrying body 14, together with the adapter 50.

Thanks to the adapter 50, in the hub assembly 1 provided with the sprocket-carrying body 14 it is possible to mount both a cogset 20, i.e. of the type with small sprockets grouped in triplets, and a cogset 70, i.e. of the type with single small sprockets: in the first case, the cogset 20 is mounted directly on the sprocket-carrying body 14; in the second case, the adapter 50 is mounted first and then the cogset 70 is mounted; in any case, it is never necessary to dismount the sprocket-carrying body 14. In this way, it is quick and easy to replace one cogset with another, even if they are of different types.

What is claimed is:

1. An adapter for a sprocket-carrying body for a bicycle rear wheel, the adapter comprising: an annular body configured to abut a sprocket-carrying body and extend in an axially outer direction and to receive sprockets in a radially peripheral position; a coupling element formed on the annular body as a shape coupling with the sprocket-carrying body so the adapter rotates as a unit with the sprocket-carrying body; and at least one sprocket-receiving seat formed on the annular body that couples with at least one sprocket so the adapter rotates as a unit with the sprocket, wherein the coupling element comprises at least one front tooth projecting axially from the annular body and dimensioned for insertion in a selected groove in the sprocket-carrying body.

2. The adapter according to claim 1, wherein the coupling element comprises four front teeth projecting axially from the annular body and dimensioned for insertion in a respected selected groove in the sprocket-carrying body.

3. The adapter according to claim 2, wherein the four front teeth are equally spaced in a circumferential direction.

4. The adapter according to claim 1, wherein the coupling element comprises a mounting key for ensuring a predetermined angular phasing of the adapter with respect to the sprocket-carrying body.

5. The adapter according to claim 1, wherein the sprocket receiving seat comprises at least one axially-extending through groove on a radially peripheral surface of the annular body for alignment with a primary groove in the sprocket-carrying body.

6. The adapter according to claim 1, wherein the sprocket receiving seat comprises four axially-extending through grooves on a radially peripheral surface of the annular body for alignment with a respective one of a plurality of primary grooves in the sprocket-carrying body.

7. The adapter according to claim 6, wherein the plurality of primary grooves are equally spaced in a circumferential direction.

8. The adapter according to claim 1, wherein the sprocket receiving seat comprises a mounting key for ensuring a predetermined angular phasing of the adapter with respect to the at least one sprocket mounted on it.

9. The adapter according to claim 1, wherein the annular body comprises a front annular surface configured for abutting against the sprocket-carrying body and a rear annular surface axially opposite the front annular surface.

10. The adapter according to claim 9, wherein the annular body further comprises recesses formed in the rear annular surface.

11. The adapter according to claim 2, wherein the annular body further comprises four recesses formed in a rear annular surface at the four front teeth.

12. A sprocket-carrying set for a bicycle rear wheel, the sprocket-carrying set comprising a sprocket-carrying body and the adapter according to claim 1.

13. A sprocket-carrying set for a bicycle rear wheel, the sprocket-carrying set comprising a sprocket-carrying body provided with grooves extending axially on the radially peripheral surface and the adapter according to claim 1.

14. An adapter for a bicycle rear wheel sprocket-carrying body, the adapter comprising: an annular body that is configured to abut a sprocket-carrying body that receives sprockets in a radially peripheral position; a coupling element on the annular body is configured to couple with the sprocket-carrying body and rotate as a unit with the sprocket-carrying body;

wherein the coupling element comprises at least one front tooth that projects axially from the annular body and is dimensioned for insertion in a predetermined groove in the sprocket-carrying body.

* * * * *